US005610382A

United States Patent [19]

[11] Patent Number: 5,610,382

[45] Date of Patent: Mar. 11, 1997

Yamamoto

[54] AUTOMATIC CASH TRANSACTION APPARATUS HAVING A MAIN BODY AND AN ADDITIONAL UNIT

[75] Inventor: Hidehiko Yamamoto, Kawasaki, Japan

[73] Assignee: Fujitsu Limited, Kawasaki, Japan

[21] Appl. No.: 459,309

[22] Filed: Jun. 2, 1995

Related U.S. Application Data

[63] Continuation of Ser. No. 91,202, Jul. 14, 1993, abandoned.

[30] Foreign Application Priority Data

Jul. 28, 1992 [JP] Japan ..................... 4-200829

[51] Int. Cl.[6] ..................... G06F 17/60; G06F 15/00

[52] U.S. Cl. ..................... 235/379; 902/20; 902/21

[58] Field of Search ..................... 235/379; 902/20, 902/21

[56] References Cited

U.S. PATENT DOCUMENTS

| | | | |
|---|---|---|---|
| 4,598,367 | 7/1986 | De Francesco et al. | 902/5 |
| 4,760,245 | 7/1988 | Fukuya | 235/380 |
| 4,818,854 | 4/1989 | Davies et al. | 235/381 |
| 5,010,238 | 4/1991 | Kadono et al. | 235/379 |
| 5,132,521 | 7/1992 | Smith et al. | 235/379 |

FOREIGN PATENT DOCUMENTS

| | | |
|---|---|---|
| 57-62454 | 4/1982 | Japan . |
| 57-120173 | 7/1982 | Japan . |
| 61-150065 | 8/1986 | Japan . |
| 4-191994 | 10/1992 | Japan . |

*Primary Examiner*—John Shepperd
*Attorney, Agent, or Firm*—Staas & Halsey

[57] ABSTRACT

The present invention discloses an automatic cash transaction apparatus having a main body and an additional unit. On the basis of instruction information from the user, an apparatus main body executes processes regarding a cash transaction while communicating with a high-order apparatus. An input/output apparatus having a telephone is provided as an additional unit for the apparatus main body. The input/output apparatus synthesizes audio data on the basis of an instruction from the apparatus main body and outputs an audio message signal to a telephone. The user operates dial buttons of the telephone in accordance with the audio message. Since the telephone has the same dial button arrangement as that of the telephone which is daily used, even a visually handicapped person can easily execute a necessary inputting operation.

18 Claims, 17 Drawing Sheets

FIG. 6

| | Processes of ATM main body (Processing step) | Control of each unit of ATM | Audio guidance to telephone | Operation of the customer | Flowsteps of Fig. 5 |
|---|---|---|---|---|---|
| 1 | Selection of transaction | Waitong for input on display | Welcome, please push a desired number. No. 1 is a withdrawal, No. 2 is a deposit, and No. 3 is a balance check | Take a receiver and press "1" | S1~S5 |
| 2 | Confirmation of the transaction selected | Cancellation of waiting for input on display | Is payment performed ? | | S6 |
| 3 | Insertion of card | Waiting for card insertion | Please insert a card into rightward front side | Insert a card | S7, S8 |
| 4 | Waiting for completion of card Insertion | Notify completion of card insertion | | | S9, S10 |
| 5 | Inputting of I D No. | | Please press the I D No. | Input I D No. (1 2 3 4 ) Press "1", "2", "3", "4" | S11, S12 |
| 6 | Confirming process of the I D No. | ( Communication with host ) | | | — |
| 7 | Money amount inputting process | | Please press a withdrawal money amount | Press withdrawal money amount(¥10,000) Press "1","0","0""0","0","#" | S13~S15 |
| 8 | Money amount confirming process | | Is withdrawal amount equal to 1000 yen ? Please press a # buttom if it is O.K. | Confirm and press "#" | S16~S18 |
| 9 | Notification of balance | | Please wait for a little while. The balance is 150,000 yen | Confirm the balance | S19, S20 |
| 10 | Counting of money amount | Payment of 10,000 yen by bill paying apparatus | | | S21 |
| 11 | Waiting for completion of payment | Notify end of preparation of paymant to main body | | | S22 |
| 12 | Guidance of card return | | Please take out the card and transaction memo on the rightward front side | Try to take the card | S23 |
| 13 | Instruction of card return | Return card | The cash will be put out | Take out the card | S24 |
| 14 | Waiting for complection of card return | Notify card return to main body | | | S25, S26 |
| 15 | Guidance of payment | | Please take out the bills of 10,000 yen from the rightward front side | Carry the hand to the bill outlet port | S27 |
| 16 | Paying process | Release of bills | | Receive the bills | S29, S40 |
| 17 | Waiting for end of payment | | | | — |
| 18 | Output of end guidance | Notify to main body that the bills were taken out | Thank you for use. Please return the receiver to it place | Return the receiver and move back | S30 |

Progress of processes →

FIG. 8

| | Process of A T M main body (processing step) | Control of each unit of A T M | Audio guidance to telephone | Operation of the customer | Frowsteps of Fig.7 |
|---|---|---|---|---|---|
| 1 | Selection of transaction | Waiting for input on display | Welcome. Please push a desired number. No.1 is a withdrawal, No.2 is a deposit, and NO.3 is a balance check. | Take a receiver and press "2" | S1~S5 |
| 2 | Confirmation of the transaction selected | Cancellation of waiting for input on display | Is money inputted ? | | S6 |
| 3 | Guidance of bankbook insertion | | Please open a bankbook and insert into the leftward front side | Look for his bankbook | S7 |
| 4 | Waiting for bankbook insertion | Waiting for bankbook insertion in bankbook printer | | Insert the bankbook | S8 |
| 5 | Waiting for completion of bankbook insertion | Notify of completion of bankbook insertion to main body | | Complete the insertion of the bankbook | S9,S10 |
| 6 | Guidance of bills insertion | | Please insert the bill inlet / outlet on the rightward front side | Deliver the insertion of the bills | S11 |
| 7 | Waiting for insertion of bills | Waiting for insertion of bills in bills deposit machine | | Insert the bills | S12 |
| 8 | Waiting for completion of insertion of the bills | | | Complete the insertion of the bills | S13,S14 |
| 9 | Guidance to count of the bills | Notify completion of insertion of bills to the main body | We are counting the bills now. Please press a # button if it is O.K. | | S15 |
| 10 | Counting process of the bills | Count the bills inserted in bill deposit machine | | | |
| 11 | Waiting for notification of counting of the bills | Notify the counted amount (¥20,000) to the main body | | | S16 |
| 12 | Confirmation of the inputted money amount | | Received amount is 20.000 yen. The balance is 150,000 yen. | Confirm the money amount and press "#" | S17~S19 |
| 13 | Notification of balance | (Communicate with host) | | Confirm the balance | S20,S21 |
| 14 | Instruction to print on bankbook | Execute print instruction to bankbook printer | | | S22 |
| 15 | Waiting for completion of bankbook printing | Notify print end to main body | | | S23 |
| 16 | Guidance to return bankbook | | Please take out the bankbook from the leftward front side.Thank you for use. | Try to take the bankbook | S24 |
| 17 | Returning press of bankbook | Instruct the return of bankbook to bankbook printer | | Take out the bankbook | S25 |
| 18 | Waiting for return of bankbook | Notify the return of bankbook to main body | | | S26,S27 |
| 19 | Output of end guidance | | Thank you for ude. Please return the receiver to its place. | Return the receiver and move back | S28 |

Progress of processes →

FIG.10

| | Processes of A T M main body ( processing step ) | Control of each unit of A T M | Audio guidance to telephone | Operation of the customer | Flowsteps of Fig.9 |
|---|---|---|---|---|---|
| 1 | Selection of transaction | Waiting for input on display | Welcome. Please push a desired number No.1 is withdrawal, No.2 is a deposit, and No.3 is a balance check | Take a receiver and press "3" | S1~ S5 |
| 2 | Confirmation of the transaction selected | Cancellation of waiting for input on display | Is balance checked ? | | S6 |
| 3 | Insertion of card | Waiting for card insertion | Please insert a card into the rightward front side. | Insert a card | S7 |
| 4 | Waiting for completion of card insertion | Notify card return to main body | | | S8~ S10 |
| 5 | Inputting of I D No. | | Please press the I D No. | Input I D No. ( 1 2 3 4 ) Press "1" "2" "3" "4" | S11,S12 |
| 6 | Confirming process of the I D No. | ( Communicate with host ) | | | S13 |
| 7 | Notification of balance | | Please wait for a little while. The balance is 150,000 yen. | Confirm the balance | S14 |
| 8 | Guidance of card return | | Please take out the card and transaction memo on the rightward front side. | | S15 |
| 9 | Instruction of card return | Return card | | Try to take the card | S16 |
| 10 | Waiting for completion of card return | Instruct to return the bankbook to main body | | | S17,S18 |
| 11 | Output of end guidance | Notify card return to main body | Thank you for use. Please return this receiver to its place. | Return the receiver and move back | S19 |

Progress of processes →

FIG.12

| | Processes of ATM main body (processing step) | Control of each unit of ATM | Audio guidance to telephone | Operation of the customer | Flowsteps of Fig.11 |
|---|---|---|---|---|---|
| 1 | Selection of transaction | Waiting for input on display | Welcome. Please push a desired number No.1 is withdrawal, No.2 is a deposit, No.3 is a balance check and No.4 is a writing on a bankbook | Take a receiver and press "4" | S1~ S5 |
| 2 | Confirmation of the transaction selected | Cancellation of waiting for input on display | Is writing on a bankbook ? | | S6 |
| 3 | Guidance of bankbook insertion | | Plase open a bankbook and insert the bankbook into the leftward front side | Look for bank book | S7 |
| 4 | Waiting for bankbook insertion | Waiting for bankbook in bankbook printer | | Insert the bankbook | S8 |
| 5 | Waiting for completion of bankbook insertion | Notify completion of bankbook insertion to main body | | Complete the insertion of the bankbook | S9,S10 |
| 6 | Notification of balance | ( Communicate with host ) | Please wait for a little while. The balance is 150,000 yen. | Confirm the balance | S11,S12 |
| 7 | Instruction of print on bankbook | Execute print instruction to bankbook printer | | | S13 |
| 8 | Waiting for completion of bankbook printing | Notify bankbook return to main body | | | S14 |
| 9 | Notification of bankbook return | | Please take out the bankbook on the leftward front side. Thank you for use | Try to take the bankbook | S15 |
| 10 | Process to return bankbook | Instruct to return the bankbook to main body | | | S16 |
| 11 | Waiting for bankbook return | Notify bankbook return to main body | | | S17,S18 |
| 12 | Output of end guidance | | Thank you for use. Please return the receiver to its place. | Return the receiver and more back | S19 |

Progress of processes →

AUTOMATIC CASH TRANSACTION APPARATUS HAVING A MAIN BODY AND AN ADDITIONAL UNIT

This application is a continuation of application Ser. No. 08/091,202, filed Jul. 14, 1993 now abandoned.

BACKGROUND OF THE INVENTION

The present invention relates to an automatic cash transaction apparatus which is used in a banking organization such as a bank or the like and, more particularly, to an automatic cash transaction apparatus for executing transaction works with the user by using an audio message.

In recent years, even in an automatic cash transaction apparatus, the realization of a high function of the apparatus is required. In association with such a demand, a number of data which is inputted to the automatic cash transaction apparatus also increases and inputting processes also become complicated. Therefore, an automatic cash transaction apparatus which can input a large amount of data by a simple method is requested. Further, nowadays persons who are physically handicapped often work in the society, and an automatic cash transaction apparatus which can be also easily used by such handicapped persons is required.

In the conventional automatic cash transaction apparatuses, there is increasing the number of apparatuses each having a construction such that in order to enable the inputting operation to the apparatus and the guidance to the user to be easily executed, a touch panel is used as an input apparatus and the touch panel is arranged so as to be overlaid on a display to display the guidance to the user. According to a display with the touch panel as mentioned above, when the inputting operation to the automatic cash transaction apparatus is requested for the user, only necessary keys can be displayed on the display, so that the user can be easily guided and the apparatus can be constructed so as to be easily used when it is operated from the user side. Although the display with the touch panel is convenient to persons who are able to see, persons who are visually handicapped cannot know the locations of input switches so long as the switches are merely displayed on the display, so that they cannot handle the display. Therefore, for example, in the automatic cash transaction apparatus disclosed in JP-A-61-893, in addition to the display with the touch panel, a special receiver to inform a request for the inputting operation to the visually handicapped person by an audio message is provided. Further, in response to the requested inputting operation, key buttons of numerals of 0 to 9 and special function key buttons for calling, inquiry, cash, cancel, and the like which are provided for the receiver are operated. In the conventional automatic cash transaction apparatus for a visually handicapped person, however, in addition to the numeric key buttons of 0 to 9, a plurality of special function key buttons onto which function names such as "confirm", "cancel", "introduce", "call", and the like are displayed, which function key buttons are used for the chromatic cash transaction apparatus and are provided as key buttons for an inputting operation provided for the receiver. Furthermore, a braille is formed on each of the function key buttons, thereby enables a visually handicapped person to discriminate and read the function key buttons by a tactile impression of the finger. However, if each of the function names such as "confirm" "cancel" "introduce", and "call" is tried to be formed by the Braille into a narrow space on each of the key buttons, each point of the Braille is extremely small that it will be difficult to read by a tactile impression of the finger.

There is consequently a problem such that even when an instruction of the inputting operation is generated by an audio message, the visually handicapped person faces a challenge of searching a necessary one of a plurality of function key buttons by the tactile impression of the finger or pushes a wrong button without being able to correctly select the necessary button, thus, cannot easily handle the apparatus.

SUMMARY OF THE INVENTION

According to the invention, an automatic cash transaction apparatus which can also be easily used even by visually handicapped persons is provided. First, an automatic cash transaction apparatus of the invention comprises: an apparatus main body for executing processes regarding a cash transaction while communicating with a high-order apparatus on the basis of instruction information from the user; a telephone for transmitting an audio sound to the user and for inputting by using dial buttons; and an input/output apparatus for synthesizing audio data on the basis of the instruction from the apparatus main body, for generating an audio signal to the telephone, for-detecting information of the dial button depressed by the user; and for transferring the detected information to the apparatus main body. In the telephone, the same twelve dial buttons indicative of the numerals of 0, 1, 2, 3, 4, 5, 6, 7, 8, 9 and a symbol "#" and "*" as those in the telephone which is generally used are arranged in a matrix form of 4 rows and 3 columns. The input/output apparatus comprises: an audio data storing section in which audio data has been stored; an audio synthesizing section for synthesizing the audio data stored in the audio data storing section on the basis of an instruction from the apparatus main body, thereby generating an audio message signal; a touch-tone kind detecting section to recognize the kind of dial button operated by the telephone; and a receiver status detecting section to detect a hooking state of the receiver of the telephone and generating a detection signal, wherein an interface function of inputting/outputting processes between the apparatus main body and the telephone is realized. According to the invention, in addition to the telephone, a speaker section is also provided. If the telephone is returned during the operation using the telephone, an outputting mode is switched to a mode to generate an audio message from the speaker section. Further, according to the invention, the speaker section and an input operating section such as a display with a touch panel which is used in the ordinary display operation are provided for the apparatus main body. Even an ordinary person can easily operate the apparatus by the audio messages which are generated from the speaker section.

According to such an automatic cash transaction apparatus of the invention as mentioned above, audio data is synthesized by an audio synthesizing section in the input/output apparatus in accordance with the instruction from the apparatus main body, an audio message signal is produced, and the audio message signal is outputted to the telephone. Therefore, even a visually handicatted person can easily listen to the instruction about the inputting operation. As a telephone, on the other hand, since the button arrangement is substantially the same as the arrangement of the dial butttons of the telephone which is daily used, he is familiar to the button operation and even if he cannot see the buttons, the necessary inputting operation can be easily performed. Further, since even a person who is not visually handicapped is familiar to the button operation of the telephone, the inputting operation can be easily performed by using the telephone in place of the display with the touch panel. It is convenient for a person who is not familiar to the operation.

The above and other objects, features, and advantages of the present invention will become apparent from the following detailed description with reference to the drawings.

BRIEF DESCRIPTION OF THE DRAWINGS

FIG. 6 is an explanatory diagram showing the relations among the apparatus main body in the paying process of the invention, each unit of the main body, the audio guidance to the telephone, the operation of the customer, and the flow steps in FIG. 5;

FIG. 8 is an explanatory diagram showing the relations among the apparatus main body in the money inputting process of the invention, each unit of the main body, the audio guidance to the telephone, the operation of the customer, and the flow steps in FIG. 7;

FIG. 10 is an explanatory diagram showing the relations among the apparatus main body in the balance checking process of the invention, each unit of the main body, the audio guidance to the telephone, the operation of the customer, and the flow steps in FIG. 9;

FIG. 12 is an explanatory diagram showing the relations among the apparatus main body in the bankbook writing process of the invention, each unit of the main body, the audio guidance to the telephone, the operation of the customer, and the flow steps in FIG. 11;

DETAILED DESCRIPTION OF THE PREFERRED EMBODIMENTS

Figure 1:
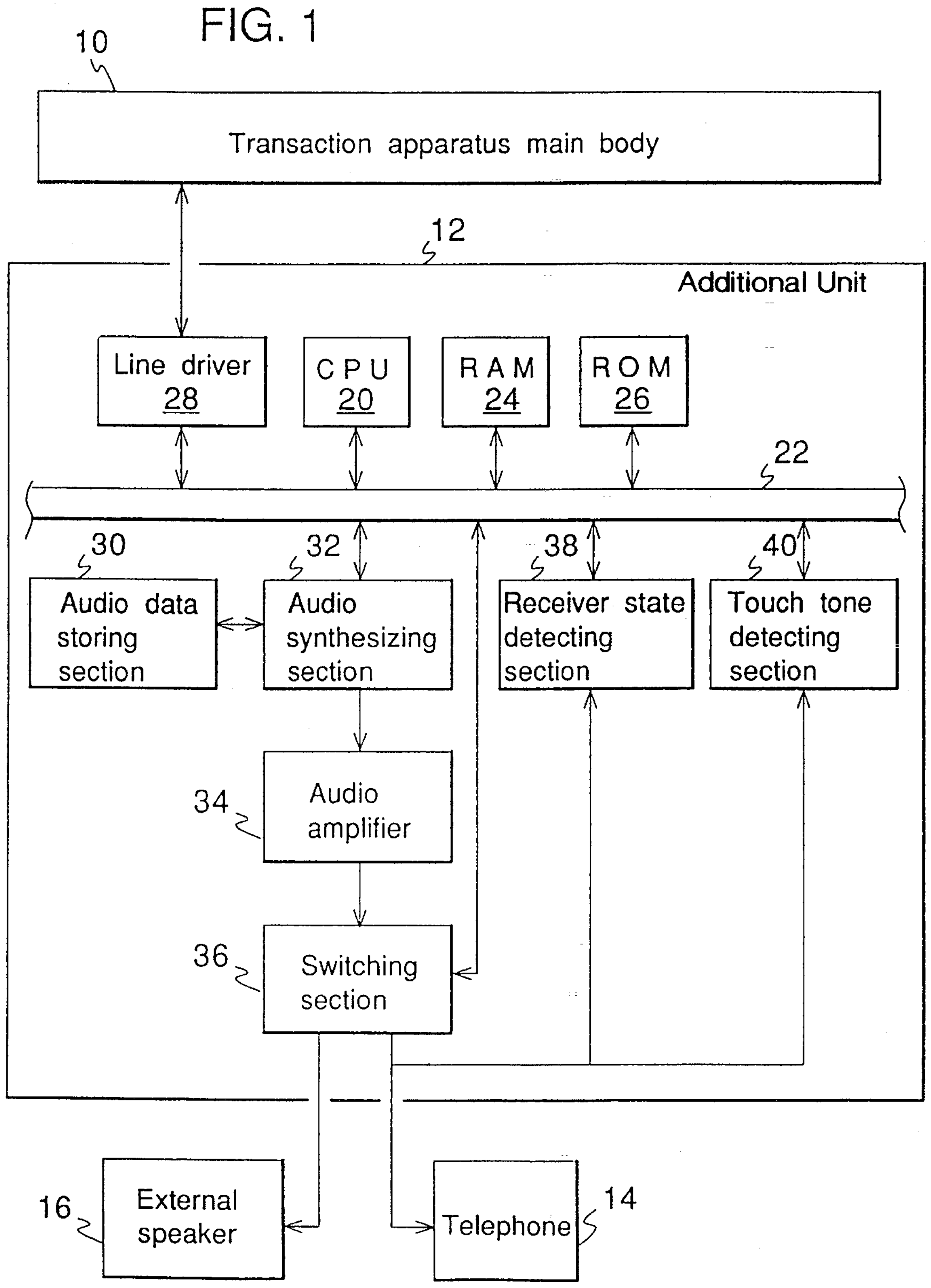
FIG. 1 is a block diagram showing the first embodiment of the present invention.

FIG. 1 shows the first embodiment of the present invention. An apparatus main body 10 of an automatic cash transaction apparatus is connected to a host computer by a communication line. An input/output (I/O) apparatus 12 is provided for the apparatus main body 10. In the embodiment, a telephone 14 and an external speaker 16 are connected to the apparatus main body 10 through the I/O apparatus 12. A CPU 20 is provided in the I/O apparatus 12. A RAM 24, a ROM 26, a line driver 28, an audio synthesizing section 32, a receiver state detecting section 38, and a touch tone detecting section 40 are connected to a CPU bus 22 of the CPU 20. The line driver 28 performs a transmission control of commands and data between the apparatus main body and the CPU 20. An audio data storing section 30 is provided for the audio synthesizing section 32. The audio synthesizing section 32 receives an instruction from the CPU 20 and synthesizes necessary audio message data and supplies as an audio signal to an audio amplifier 34. Namely, the CPU 20 decodes an instruction command of the operation input for the user which was generated from the apparatus main body 10. In accordance with the result of the decoding process, the audio synthesizing section 32 extracts the necessary audio data from the audio data storing section 30 and forms audio message data. As a telephone 14 connected to the apparatus main body 10 through the I/O apparatus 12, a commercially available telephone having a transmitter, a receiver, and dial buttons can be directly used. A multifrequency signal is generated in response to the operation of the dial buttons. For the telephone 14, the receiver state detecting section 38 and the touch tone detecting section 40 are provided in the I/O apparatus 12. The receiver state detecting section 38 detects an off-hook state when the user picks up the telephone 14 and an on-hook state when the user returns the telephone 14 and notifies, the result of the detection to the CPU 20. The touch tone detecting section 40 detects the multifrequency signal, namely, a tone signal generated by the operation off the dial buttons in the telephone 14 and discriminates the operated dial buttons and notifies the result of the discrimination to the CPU 20. In the embodiment of FIG. 1, the external speaker 16 is provided in addition to the telephone 14. The audio message signal generated from the audio synthesizing section 32 is transmitted to a switching section 36 through the audio amplifier 34. In the switching section 36, the audio message signal is switched and sent to either one of the telephone 14 and the external speaker 16. The operation of the switching section 36 is switched by the control from the CPU 20. That is, when the on-hook detection state in which the user has returned the telephone 14 is obtained by the receiver state detecting section 38, the switching section 36 is switched to the external speaker 16 side, thereby allowing an audio message to be generated from the external speaker 16. On the other hand, when the user picks up the telephone 14 and the off-hook state is detected by the receiver state detecting section 38, the switching section 36 is switched to the telephone 14 side, thereby allowing an audio message to be generated from the receiver of the telephone 14.

Figure 2:
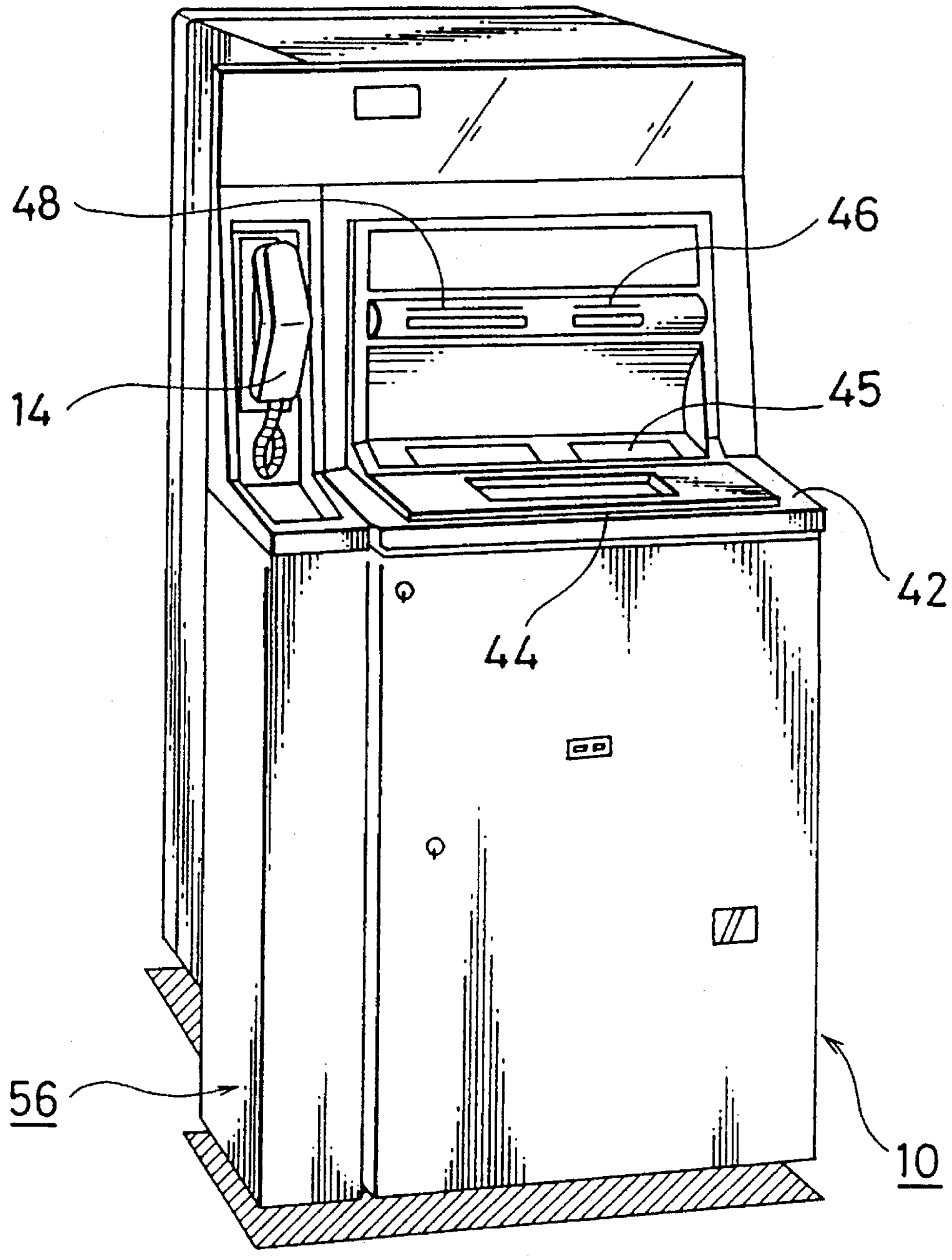
FIG. 2 is an external explanatory diagram of an automatic cash transaction apparatus according to the invention.
Figure 3:
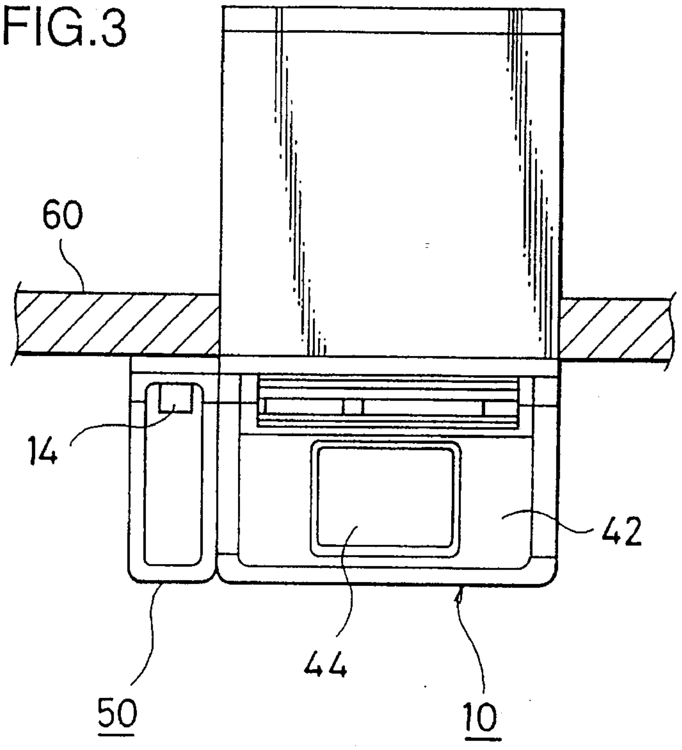
FIG. 3 is a plan view of FIG. 2.

FIG. 2 shows an external view of the automatic cash transaction apparatus of the invention. The apparatus main body 10 is of the standing type and an operation panel 42 is provided in the front portion. A display 44 with a touch panel and a bill inlet/outlet 45 are provided for the operation panel 42. A card inserting port 46 and a bankbook inserting port 48 are provided in the upper portion of the operation panel 42. An additional unit 56 is provided on the left side of the apparatus main body 10. The telephone 14 is attached to the additional unit 56. The I/O apparatus 12 shown in FIG. 1 is built in it. The automatic cash transaction apparatus of the invention, therefore, can be realized by arranging the additional unit 56 having the I/O apparatus 12, telephone 14, and further speaker 16 shown in FIG. 1 for the existing apparatus main body 10 so as to be neighboring therewith. The function of the additional unit 56 can be also provided integratedly with the apparatus main body 10 from the beginning. FIG. 3 is a plan view of FIG. 2. The apparatus main body 10 is attached so as to penetrate a partition wall 60. The additional unit 56 is arranged on the outside of the partition wall 60.

Figure 4:
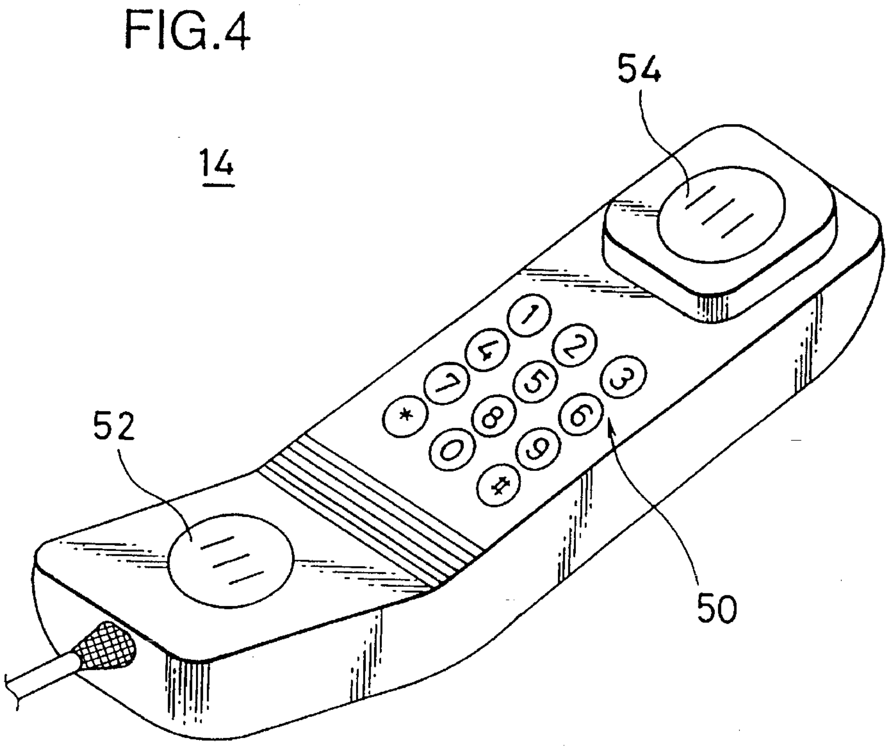
FIG. 4 is an explanatory diagram of a telephone which is used in FIG. 2.

FIG. 4 shows a handset of the telephone 14 provided on the additional unit 56 side in FIG. 2. A commercially available telephone can be used as a telephone 14. The telephone 14 has a transmitter 52 and a receiver 54 and push buttons 50 which are used as guide buttons are provided between the transmitter 52 and the receiver 54. The push buttons 50 comprise total twelve buttons such as nuumber buttons of "0 to 9", a symbol button of "*" and a symbol button of "#" and has an arrangement like a matrix of 4 rows and 3 columns in a manner similar to the ordinary telephone. Therefore, even the visually handicapped person is familiar to the operation of the push buttons 50 of such a telephone 14 because he daily uses such push buttons. In the invention, since the inputting operation is executed by using the push butons 50 of the telephone 14 which the user is familiar with, not only the visually handicapped person but also the ordinary man can easily perform the inputting operation.

Figure 5A:
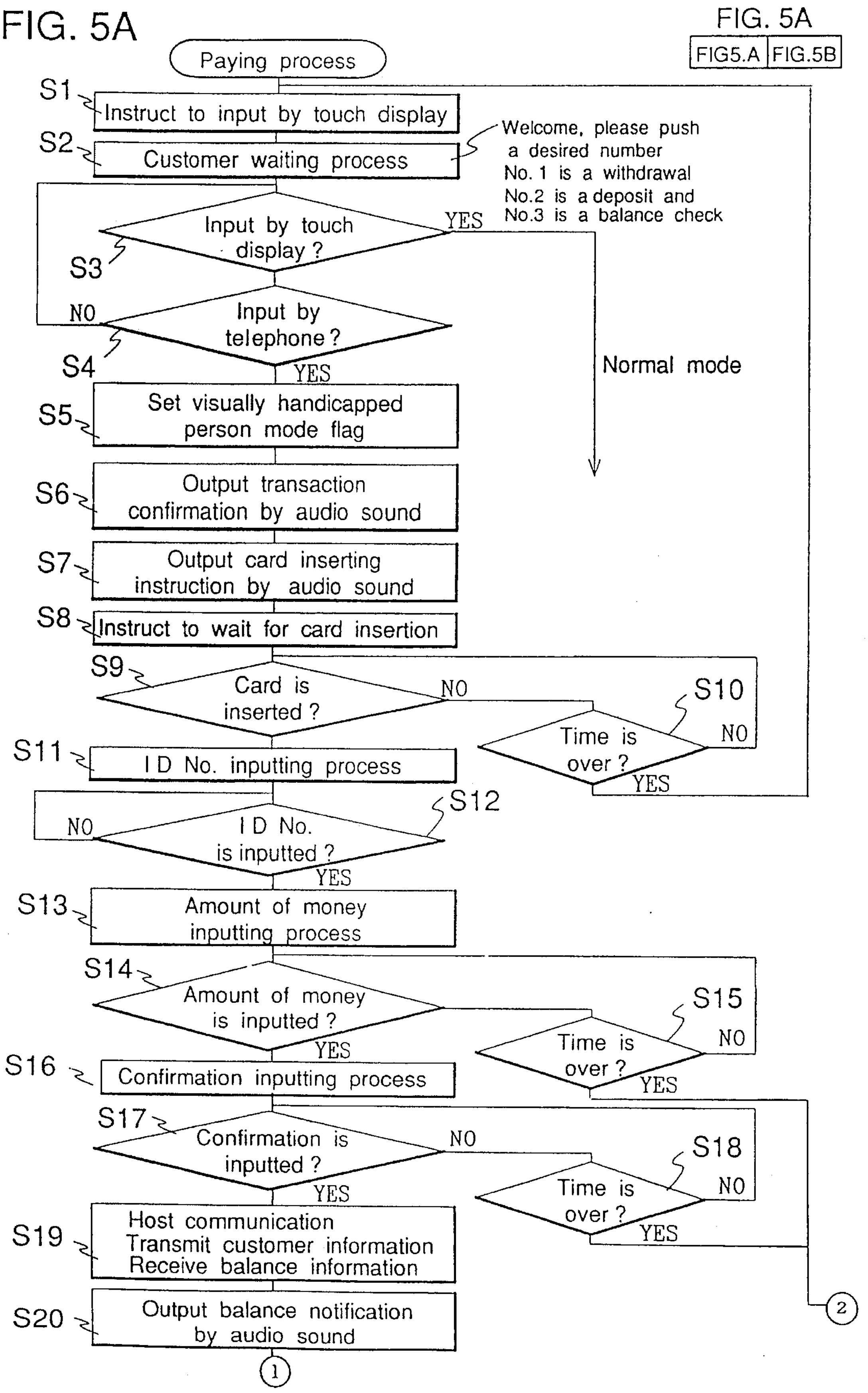
FIGS. 5A and 5B are flowcharts showing a paying process according to the invention.
Figure 5B:
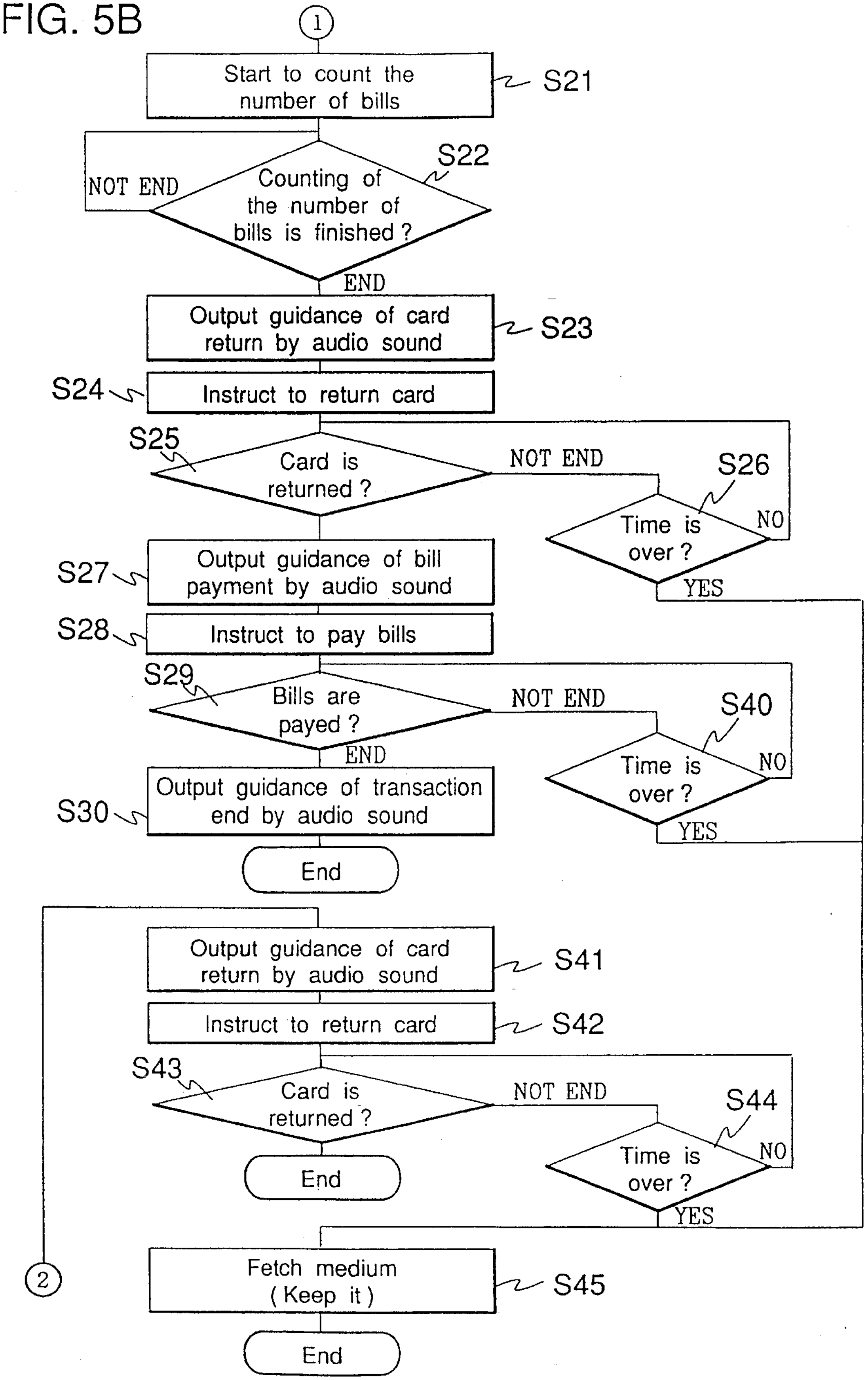

A flowchart of FIGS. 5A and 5B show a paying process of the automatic cash transaction apparatus of the invention. The money paying process will now be explained hereinbelow. First, in step S1, an input instruction is displayed on the display 44 with the touch panel. In step S2, a customer waiting process by an audio message for a visually handicapped person is executed. As an audio message for the customer waiting process, for example, "Welcome, please push a desired number. No. 1 is a withdrawal, No. 2 is a deposit, and No. 3 is a balance check." is generated. In step S3, the presence or absence of an input of the display 44 with the touch panel is discriminated. When there is an input from the display 44 with the touch panel, a conventional money paying process in the ordinary mode, namely, by the operation display and operation input for the display 44 with the touch panel is executed. In step S4, the presence or absence of an input from the telephone 14 is judged. When the user picks up the telephone 14 and pushes the dial button No. 1 for the money paying process in accordance with the audio message generated by the customer waiting process in step S2, the input from the telephone is discriminated. The processing routine advances to step S5 and a flag of a visually handicapped person mode (audio mode) is set. In this instance, the input from the touch panel is ignored in also consideration of a situation such that the visually handicapped person erroneously touches the touch panel. Subsequently, in step S6, an audio output for confirmation of the transaction is performed. In step S7, a card inserting instruction is generated. In step S8, an instruction to wait for the insertion of the card is generated to a card reader/writer unit (not shown). After that, the apparatus waits for the card insertion in step S9. When there is a card insertion before the time-over in step S10, step S11 follows and a processing request for the input of a personal identification number (hereinafter, simply referred to as an ID No.) by an audio output is executed. In step S12, the apparatus waits until the ID No. is inputted. When there is an input of the ID No. from the telephone, an audio message is generated so as to input an amount of money to be paid, thereby executing a money amount inputting process in step S13. Subsequently, in step S14, the apparatus waits until the amount of money is inputted. When there is an input of the money amount before the time-over is discriminated in step S15, the processing routine advances to step S16. A confirmation of the inputted money amount is generated by an audio message and the button "#" of the telephone is pushed, thereby inputting the confirmation. When the confirmation input is obtained in step S17 before the time-over in step S18, a communication is made to the host computer, thereby transmitting the customer information and receiving the balance information. In step S20, the balance is notified by an audio output. In step S21, the operation to count the number of bills in which a request for the payment was received is started. After completion of the counting operation of the number of bills in step S22, step S23 follows and a guidance to return the card is generated by an audio output. In step S24, an instruction to return the card for the card reader/writer unit (not shown) is displayed. In step S25, th end of the return of the card is judged before the time-over in step S26, step S27 follows and the payment of the bills is guided by an audio output, thereby promoting that the bills are taken out. In step S27, an instruction to pay the bills is similarly displayed for a bill paying unit (not shown). Subsequently, when the operation to take out the bills is finished in step S29 before the time-over in step S40, the processing routine advances to step S30 and a guidance of the end of the transaction is generated by an audio output and the series of processes are finished. On the other hand, when the time-over occurs during the money amount inputting process in step S15 or the confirmation inputting process after the input of the money amount in step S18, step S41 follows and it is regarded that the paying process was stopped during the operation, so that a guidance to return the card is generated by an audio output. In step S42, an instruction to return the card is displayed for the card reader/writer (not shown). In step S43, the return of the card is confirmed and the series of processes are finished. Further, when the time-over occurs in step S26 after the return of the card was instructed or in step S40 after the payment of the bills was instructed, the processing routine advances to step S45 and it is regarded that the the user forgot to take out the card or bills. Therefore, the medium is fetched into the apparatus main body and the series of processes are finished. The above procedure is also similarly executed with respect to the time-over after the return of the card was instructed in step S44.

FIG. 6 shows the controls of the apparatus main body and each unit thereof in the paying process in FIGS. 5A and 5B, the contents of the audio guidances to the telephone, and the operation of the customer with respect to the processing steps 1 to 18 shown on the left side of the diagram. The corresponding relations with flow steps in FIG. 6 are also shown in the right edge portion.

Figure 7A:
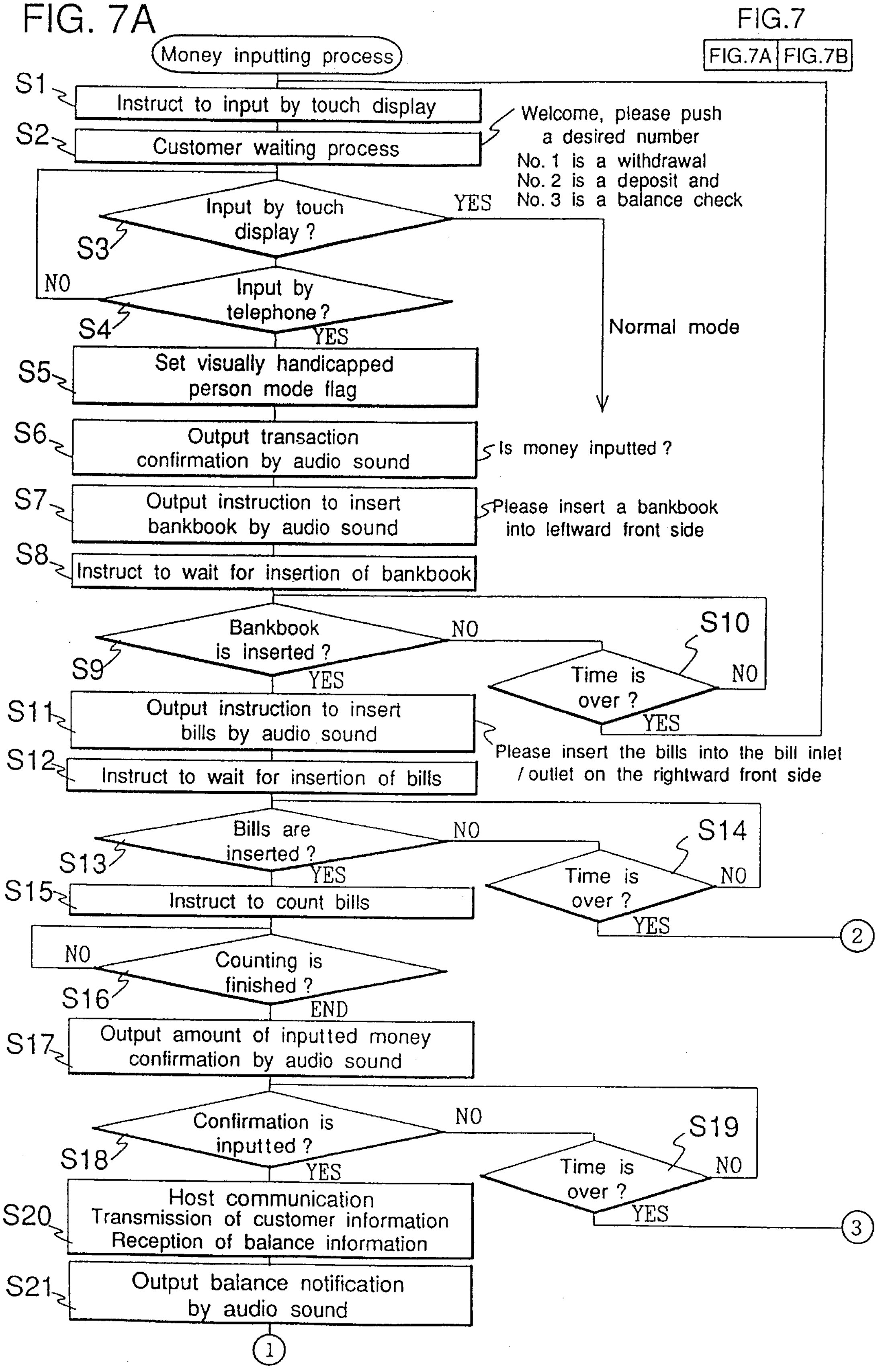
FIGS. 7A and 7B are flowcharts showing a money inputting process according to the invention.
Figure 7B:
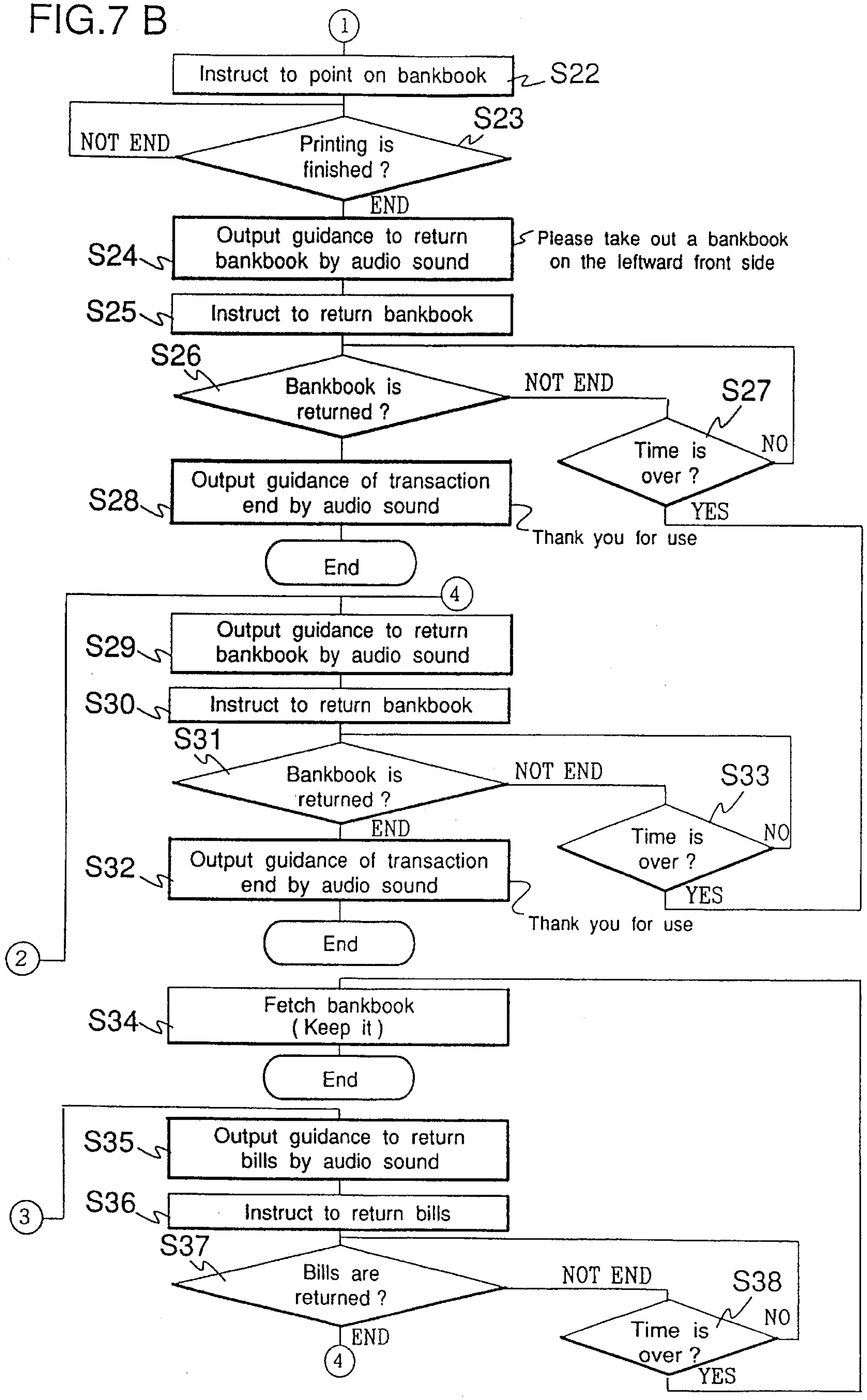

A flowchart of FIGS. 7A and 7B show a money inputting process by the automatic cash transaction apparatus of the invention. The money inputting process is as follows. First, in step S1, an input instruction is displayed on the display 44 with the touch panel. In step S2, a customer waiting process by the audio message is performed for the visually handicapped person. For example, "Welcome, please push a desired number. No. 1 is a withdrawal, No. 2 is a deposit, and No. 3 is a balance check." is generated. Subsequently, in step S3, the presence or absence of an input of the display 44 with the touch panel is judged. When there is an inputting operation for the money inputting process from the display 44 with the touch panel, the apparatus enters the ordinary mode and the conventional money inputting process by the operation display and operation input for the display 44 with the touch panel is executed. In step S4, the presence or absence of an input from the telephone 14 is discriminated. When the user picks up the telephone 14 and pushes the dial button No. 2 for the money inputting process in accordance with the audio message generated in the customer waiting process in step S2, the telephone input is judged. Step S5 follows and the flag of the visually handicapped person mode (audio mode) is set. Subsequently, in step S6, a confirmation of the transaction is generated by the audio output. In step S7, an instruction to insert the bankbook is generated by an audio output. As an audio output for the insertion of the bankbook, for example, "Please open the bankbook and insert the bankbook into the leftward front side.". Therefore, the user inserts the bankbook into the bankbook inserting port 48 provided on the left side in the upper portion of the operation panel 42 shown in FIG. 2. In step S8, an instruction to wait for the insertion of the bankbook is generated to a bankbook printer unit provided on the inside of the bankbook inserting port 48. After that, the apparatus waits for the insertion of the bankbook in step S9. When the bankbook is inserted before the time-over in step S10, the processing routine advances to step S11 and as an audio output to instruct the insertion of the bills, for example, "Please insert the bills into the bill inlet/outlet on the rightward front side." is generated. By receiving the instruction by such an audio output, the user puts the bills into the bill inlet/outlet 45 on the right side of the operation panel 42 in FIG. 2. Subsequently, in step S12, the waiting for the insertion of the bills is instructed to a bill inputting unit having the bill inlet/outlet 45. The apparatus waits for the insertion of the bills in step S13. When the bills are inserted before the time-over in step S14, step S15 follows and the operation to count the number of bills is instructed to the bill inputting unit. In response to such an instruction, the bill inputting unit counts the number of inserted bills. When the counting operation is finished in step S16, the count number is informed to a counter unit. Subsequently, in step S17, an audio output to confirm the amount of inputted money is generated. For such a confirmation input, the operation to push the button "#" of the telephone is instructed. When the confirmation input is obtained in step S18 before the time-over in step S19, step S20 follows and a communication with the host computer is executed, thereby transmitting the customer information and receiving the balance information. After that, in step S21, the balance after the money was inputted is generated by an audio output. In step S22, a printing process is executed by a bankbook printer. After completion of the printing process in step S23, a guidance to return the bankbook is generated by an audio output in step S24. For example, an audio output of such as "Please take out a bankbook on the leftward front side. Thank you for use." is generated. In step S25, an instruction to return the bankbook is generated to the bankbook printer. The bankbook after completion of the printing process is sent out to the bankbook inserting port 48 in FIG. 2. In step S26, a check is made to see if the user has taken out the bankbook or not. When the bankbook is taken out before the time-over in step S27, step S28 follows and a guidance to finish the transaction is generated by an audio output and the series of money inputting processes are finished.

On the other hand, when a time-over occurs with respect to a test input in step S14 of monitoring the time-over of the waiting for the insertion of the bills, step S29 follows. A guidance to return the bankbook is generated by an audio output. In step S30, an instruction to return the bankbook is generated to the bankbook printer. When the bankbook is returned in step S31 before the time-over in step S33, a guidance to finish the transaction is generated by an audio output in step S32. When the time-over in step S33 occurs in the process to wait for the end of the return of the bankbook in step S31, step S34 follows and it is determined that the user forgot to take out the bankbook, so that the bankbook is fetched into the apparatus main body and is held.

When the time-over occurs in step S19 in a waiting state of the confirmation of the money input after the number of bills was counted, step S35 follows and a guidance to return the bills is generated by an audio output. In step S36, an instruction to return the bills is generated to the bill inputting unit. When the end of the returning process of the bills is confirmed in step S37 before the time-over in step S33, the processing routine is returned to step S32 and the series of processes in association with the return of the bankbook are executed and the processing routine is finished. When the time-over occurs in step S38, step S34 follows and it is determined that the user forgot to take out the bills, so that the bills are fetched into the apparatus main body and are held.

FIG. 8 shows controls of the apparatus main body and each unit thereof in the money inputting process in FIGS. 7A and 7B, the audio guidance to the telephone, and the operation of the customer with respect to processing steps 1 to 18 shown on the left side. The corresponding relation with the flow steps in FIG. 7 are also shown in the right edge portion in FIG. 8.

Figures 9, 9A:
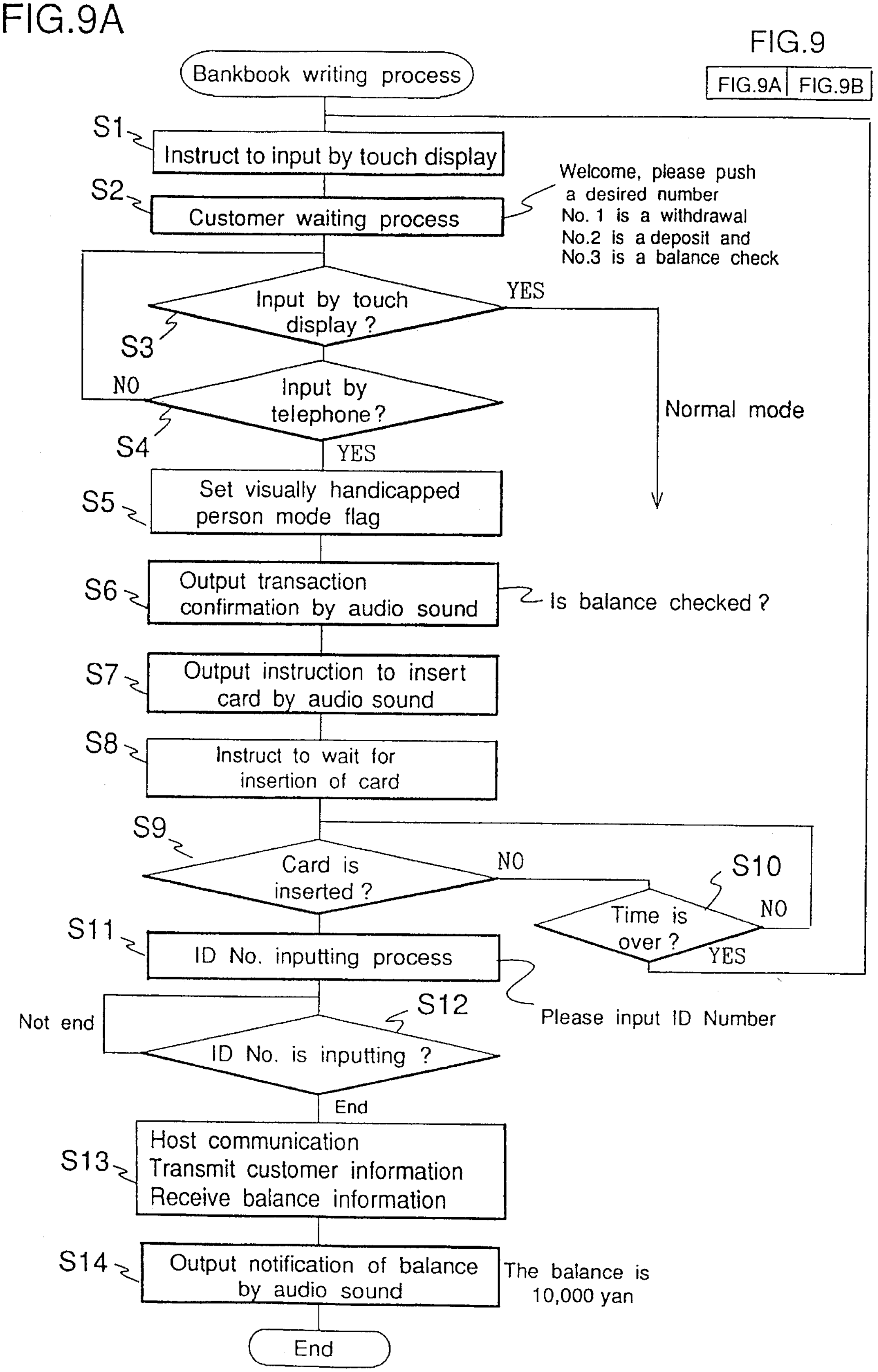
FIGS. 9A and 9B are flowcharts showing a balance checking process according to the invention.
Figure 9B:
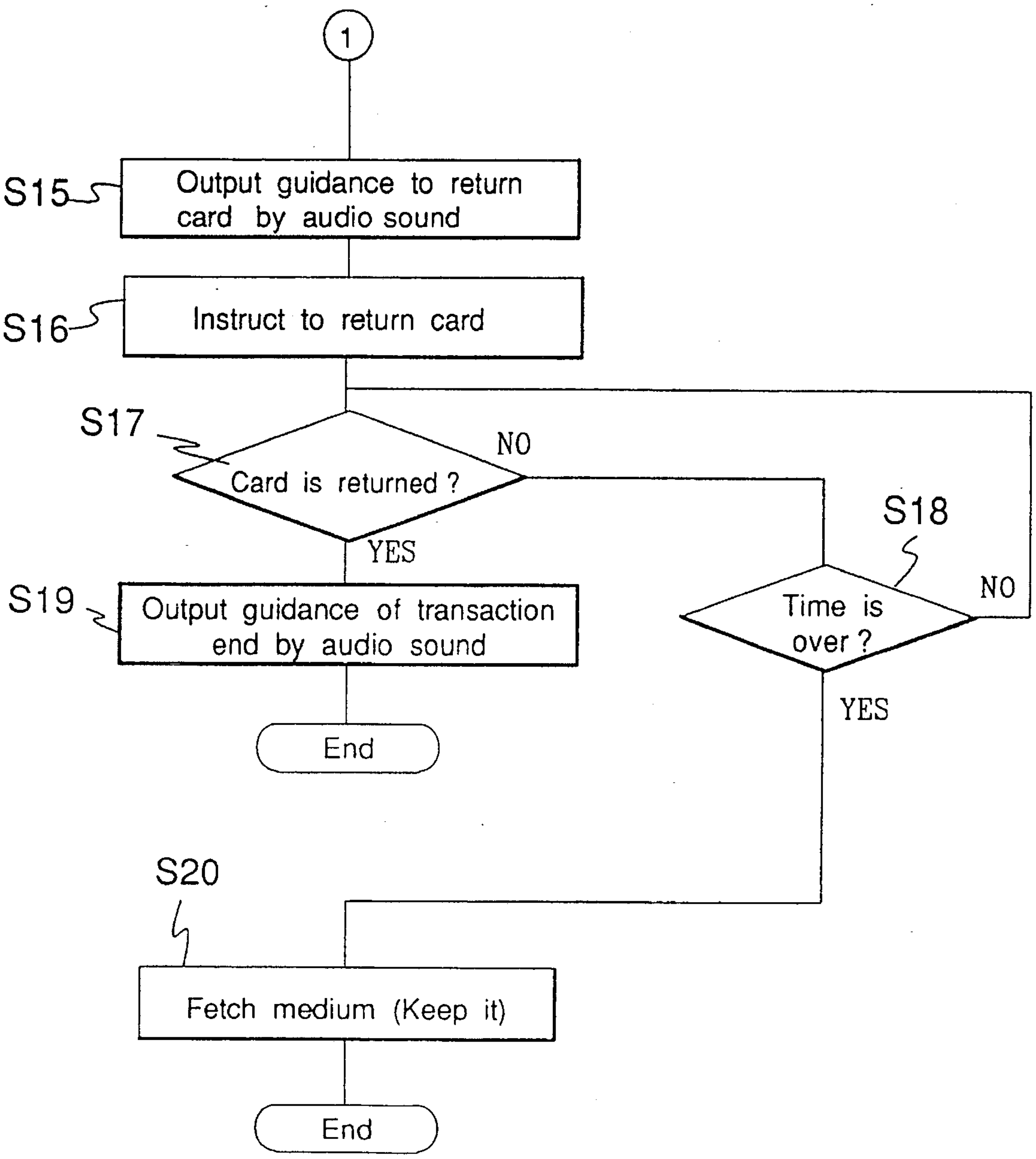

A flowchart of FIGS. 9A and 9B show a balance checking process by the automatic cash transaction apparatus of the invention. The balance checking process is as follows. First, in step S1, an input instruction is displayed on the display with the touch panel. In step S2, a customer waiting process by an audio message is performed for the visually handicapped person. As such an audio message, for example, "Welcome, please push a desired number. No. 1 is a withdrawal, No. 2 is a deposit, and No. 3 is a balance check." is generated. In step S3, the presence or absence of an input of the display 44 with the touch panel is judged. When there is an input, the conventional balance checking process in the ordinary mode is executed. In step S4, the presence or absence of an input from the telephone 14 is discriminated. When the user picks up the telephone 14 and pushes the dial button No. 2 for the balance checking process in accordance with the audio message generated in the customer waiting process in step S2, the telephone input is judged. Step S5 follows and the flag of the visually handicapped mode (audio mode) is set. In step S6, a transaction confirmatin of "Is balance checked? " is generated by an audio output. In step S7, an instruction to insert the card such as "Please insert a Card to the rightward front side." is generated by an audio output. In step S8, an instruction to wait for the insertion of the card is generated to the card reader/writer unit. After that, when the card is inserted before the time-over in step S10, the processing routine advances from step S9 to step S11 and a process to input the ID No. is requested by an audio output such as "Please input ID No..". In step S12, the apparatus waits until the ID No. is inputted by the operation of the telephone. In step S13, a communication with the host computer is performed, thereby transmitting the customer information and receiving the balance information. In step S14, the balance is informed to the user by an audio output. In step S15, a guidance to return the card is generated by an audio output. In step S16, an instruction to return the card is generated to the card reader/writer. When the user takes out the card before the time-over in step S18, the processing routine advances from step S17 to step S19 and a guidance to finish the transaction of the balance checking process is generated by an audio output. When the time-over occurs in step S18, it is determined that the user forgots to take out the card, so that the card is fetched into the apparatus main body and is held.

FIG. 10 shows the controls of the apparatus main body and each unit thereof in the balance checking process in FIGS. 9A and 9B, the audio guidance to the telephone, and the operation of the customer with respect to the processing steps 1 to 11 shown on the left side. The corresponding relation with the flow steps in FIG. 9 are also shown in the right edge portion in FIG. 10.

Figure 11:
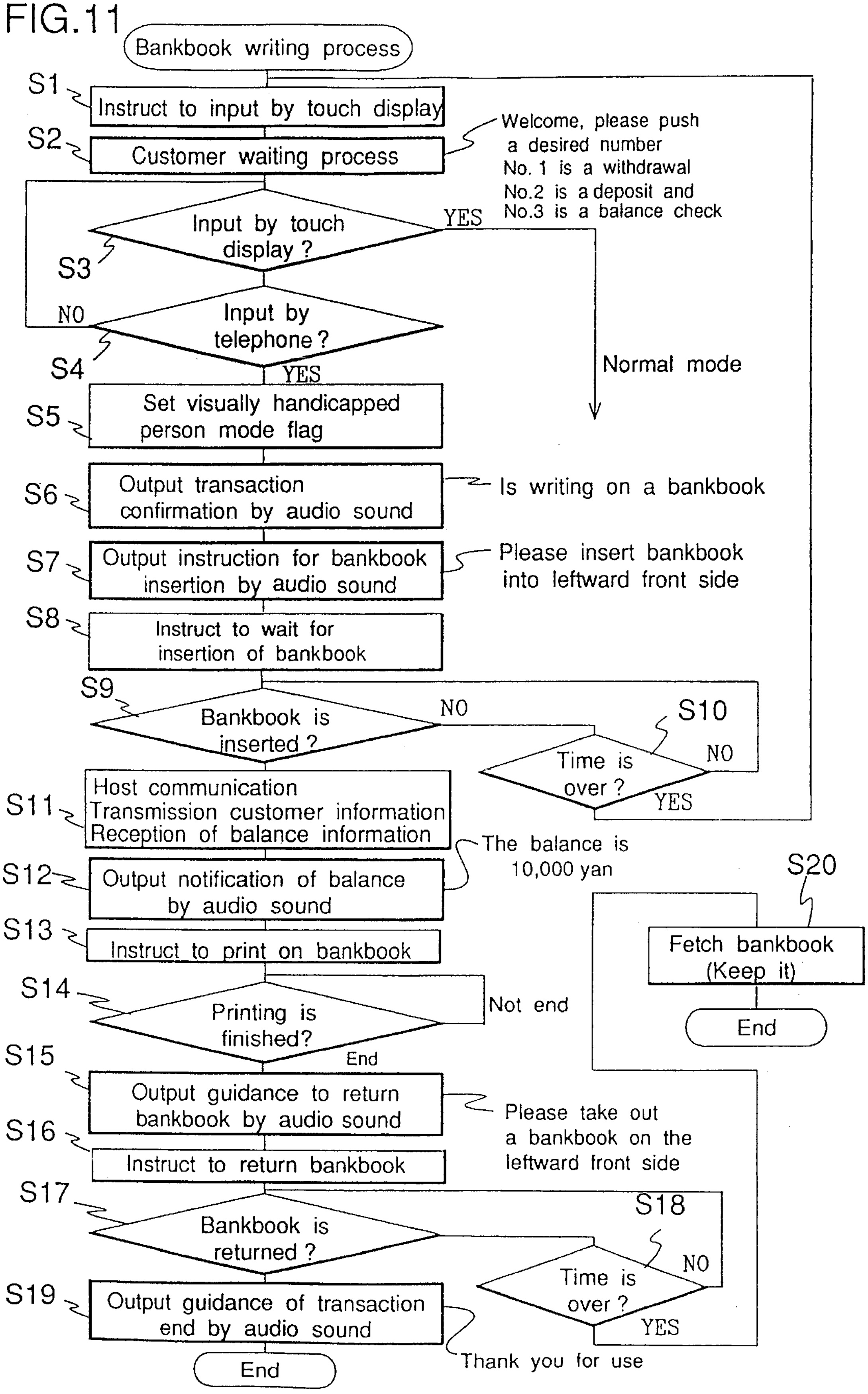
FIG. 11 is flowcharts showing a bankbook writing process according to the invention.

The flowcharts of FIGS. 11A and 11B show a bankbook writing process by the automatic cash transaction apparatus of the invention. The bankbook writing process is as follows. First, in step S1, an input instruction is displayed on the display 44 with the touch panel. In step S2, a customer waiting process by an audio message is executed for a visually handicapped person. As an audio message, for example, "Welcome, please push a desired number. No. 1 is a withdrawal, No. 2 is a deposit, No. 3 is a balance check, and No. 4 is a writing on a bankbook." is generated. Although "No. 4 is a writing on a bankbook" is omitted for the audio message of the customer waiting process in FIGS. 5A, 7A and the audio message including it is actually generated. In step S3, the presence or absence of an input from the display 44 with the touch panel is judged. When there is an input, the conventional bankbook writing process in the ordinary mode is executed. In step S4, the presence or absence from the telephone 14 is discriminated. When the user picks up the telephone 14 and pushes the dial button No. 4 for writing on the bankbook in accordance with the audio message generated in the customer waiting process in step S2, the telephone input is judged and step S5 follows. The flag of the visually handicapped person mode (audio mode) is set. In step S6, a confirmation of the transaction such as "Is writing on a bankbook? " is generated by an audio output. In step S7, an instruction to insert the bankbook such as "Please open a bankbook and insert into the leftward front side." is generated by an audio output. In step S8, an instruction to wait for the insertion of the bankbook is generated for the bankbook printer. When the bankbook is inserted in step S9 before the time-over in step S10, step S11 follows. In step S11, a communication with the host computer is executed, thereby transmitting the customer information and receiving the bank writing information including the balance information. In step S12, the present balance is informed to the user by an audio output. After that, the printing process is instructed to the bankbook printer in step S13. In step S14, after completion of the printing process by the bankbook printer, step S15 follows and a guidance to return the bankbook such as "Please take out a bankbook on the leftward front side" is generated by an audio output. An instruction to return the bankbook is generated to the bankbook printer in step S16. When the bankbook is returned in step S17 before the time-over in step S18, step S19 follows and a guidance of the end of the transaction is generated. When the time-over occurs in step S18, it is regarded that the user forgot to take out the bankbook, so that the bankbook is fetched into the apparatus main body and is held in step S20.

FIG. 12 shows the controls of the apparatus main body and each unit thereof in the bankbook writing process in FIGS. 11A and 11B, the audio guidance to the telephone, and the operation of the customer with respects to processing steps 1 to 12 shown on the left side. The corresponding relations with the flow steps in FIGS. 11A and 11B are also shown in the right edge portion.

Figure 13:
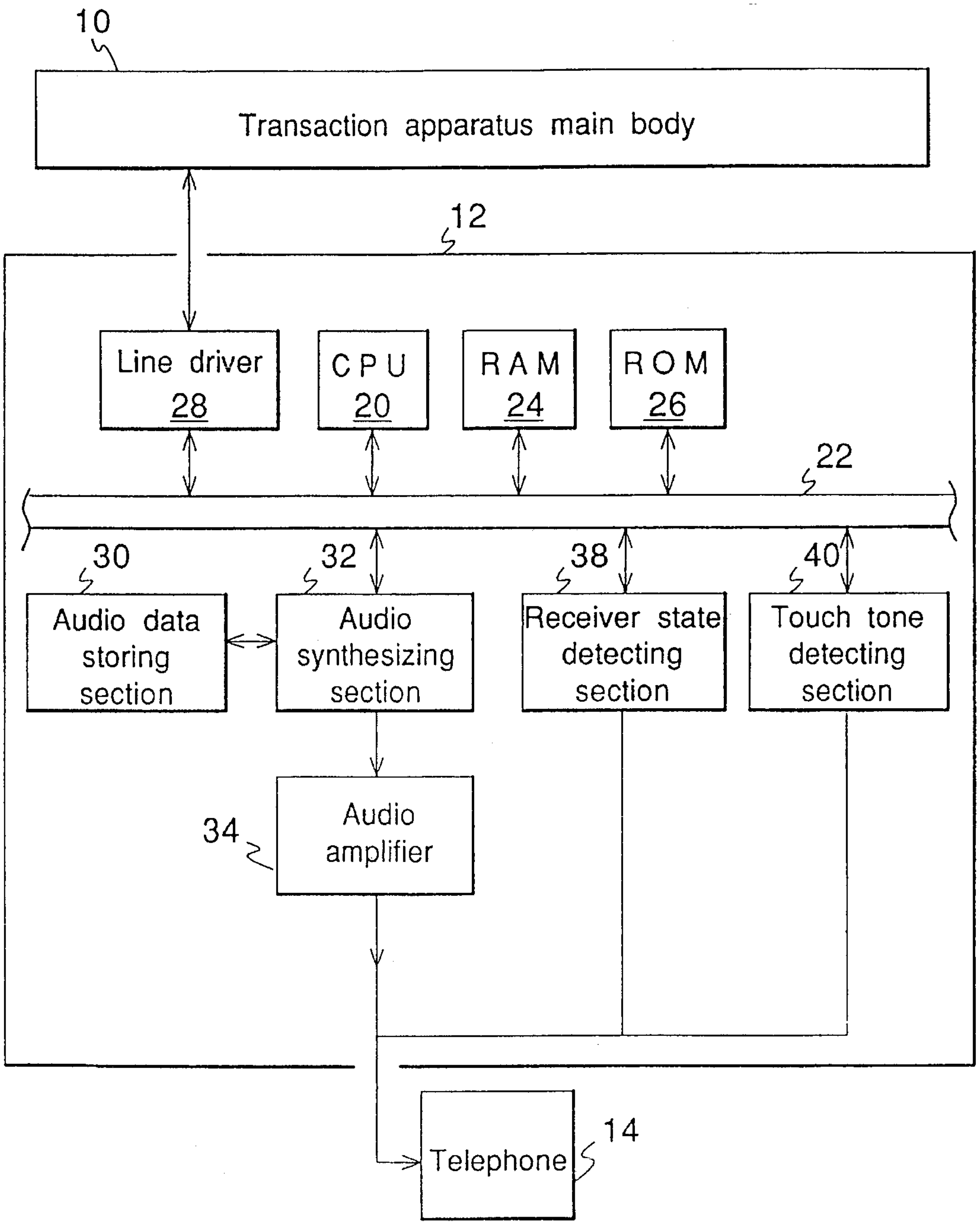
FIG. 13 is a block diagram showing the second embodiment of the invention.

FIG. 13 shows the second embodiment of the invention. According to the second embodiment, only the telephone 14 is connected to the apparatus main body 10 through the I/O apparatus 12 and the external speaker 16 provided in the first embodiment in FIG. 1 is omitted. Since the external speaker 16 is not used, the switching section 36 provided for the I/O apparatus 12 is also omitted. The audio message signal from the audio amplifier 34 is directly supplied to the telephone 14. The other construction is substantially the same as that in the embodiment of FIG. 1. In the second embodiment, in a state in which the user picks up the telephone 14, each of the processes such as payment, money input, balance check, and writing on a bankbook is executed for the telephone 14 by an audio message.

Figure 14:
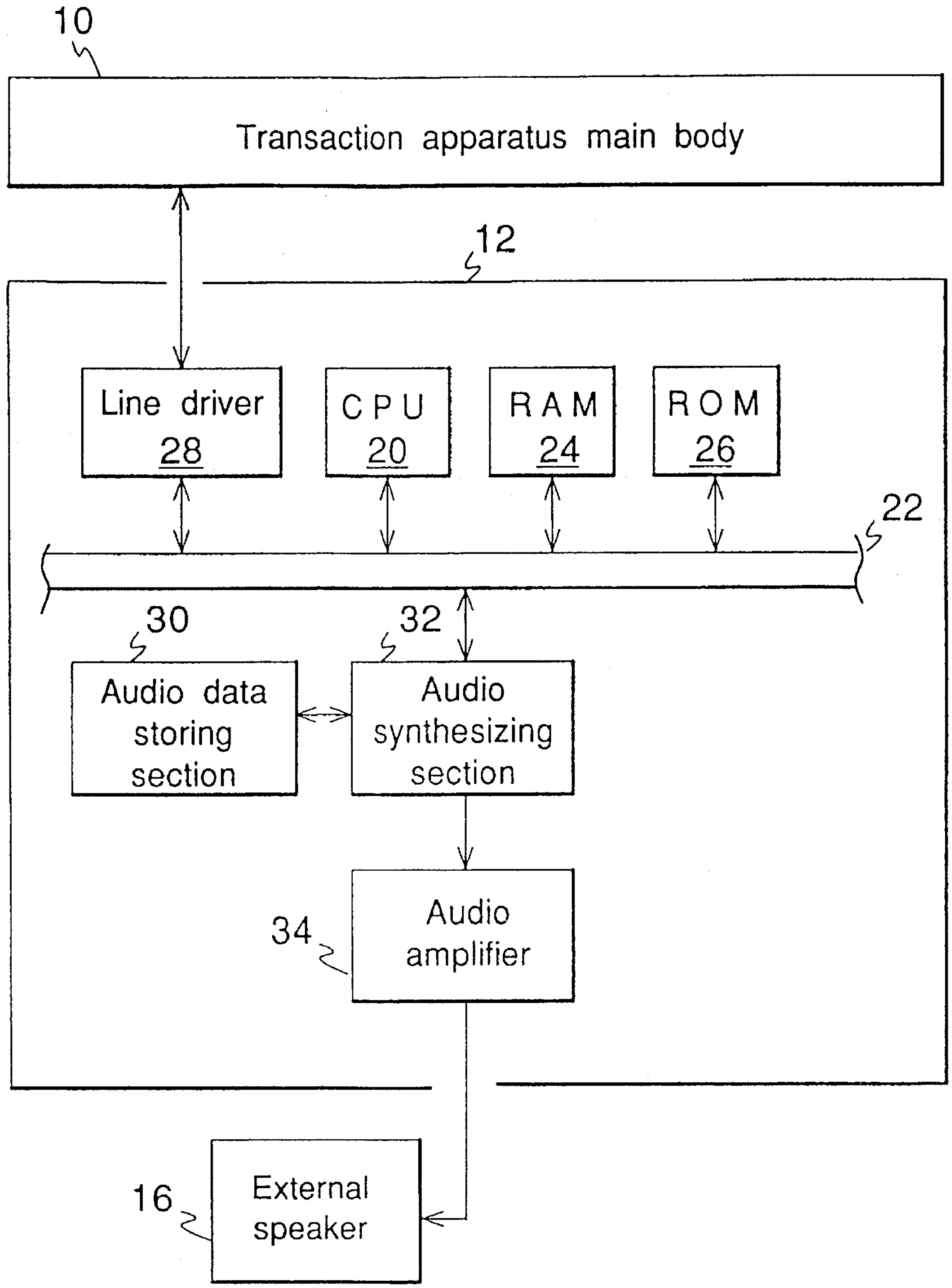
FIG. 14 is a block diagram showing the third embodiment of the invention.

FIG. 14 shows the third embodiment of the invention. In the third embodiment, only the external speaker 16 is connected to the apparatus main body 10 through the I/O apparatus 12. Therefore, the telephone 14 and the switching section 36, receiver state detecting section 38, and touch tone detecting section 40 provided in the I/O apparatus 12 in the first embodiment of FIG. 1 are omitted. The third embodiment is not used for the visually handicapped person but intends to further make it easy to use the apparatus by normal persons. Namely, since the display 44 with the touch panel is provided for the apparatus main body 10 as shown in FIG. 2, the user executes the necessary inputting operation by using the display 44 with the touch panel in response to the audio message from the external speaker 16 by the I/O apparatus 12. In this case, different from the first embodiment, even in case of the transaction from the telephone 14, a desired operation can be inputted from the display 44 with the touch panel. In this instance, in each of the processes for the payment, deposit, balance check, and writing on a bankbook in FIGS. 5, 7, 9, and 11, the same instruction is displayed on the display 44 with the touch panel subsequent to the output of the audio message. Therefore, the user can selectively operate a desired operation button displayed while looking at the display content on the display 44 with the touch panel together with the audio message. As compared with the inputting/outputting operation of only the display with the touch panel, since the audio message is generated by the external speaker 16, the operation can be more easily executed.

Figure 15:
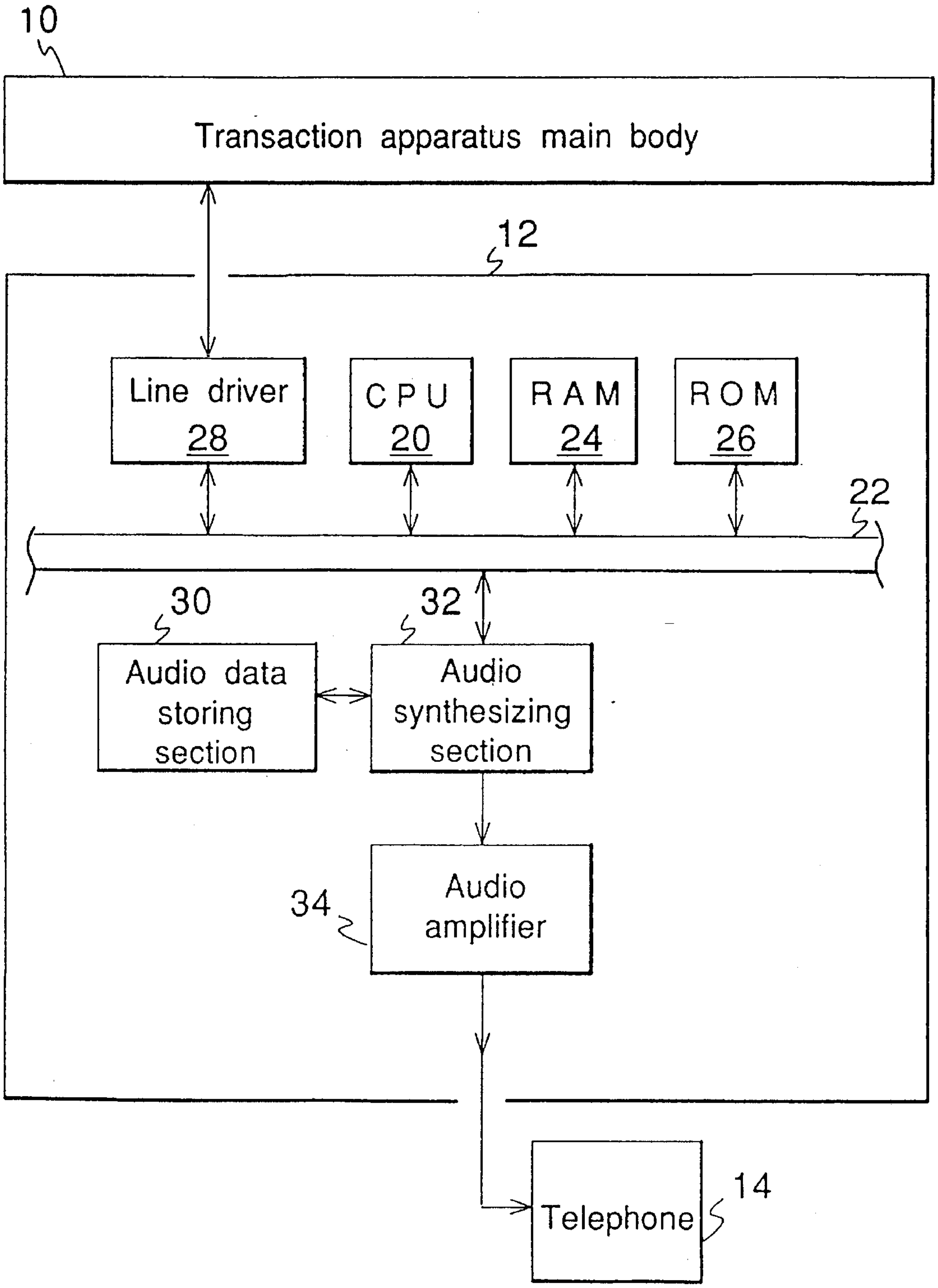
FIG. 15 is a block diagram showing the fourth embodiment of the invention.

FIG. 15 shows the fourth embodiment of the invention. The receiver state detecting section 38 and the touch tone detecting section 40 in the I/O apparatus 12 in the second embodiment of FIG. 13 are omitted, the telephone 14 is used only for generating an audio message, and an inputting operation is executed by the display with the touch panel provided for the apparatus main body 10. According to the fourth embodiment, simultaneously with that the audio message is listened by the telephone 14, the user operates a desired button on the display with the touch panel while looking at a guidance display content on the display. Therefore, since two guidances by the audio message and the display are provided, the operation can be further easily executed.

According to the invention as mentioned above, by picking up the telephone, a guidance by the audio message is executed through the telephone. In response to an input instruction by the audio message, by operating the dial buttons having substantially the same arrangement as that of the ordinary telephone provided for the telephone, a desired operation can be inputted. Therefore, even for a visually handicapped person, it is sufficient to operate the dial buttons which he is familiar in the daily life. An inputting operation can be simply easily executed for the cash transaction apparatus. In addition, even in case of an ordinary person who is not visually handicapped, by listening to the audio message, the inputting operation can be further easily performed.

The audio messages and display contents in the automatic cash transaction apparatus of the invention can be also expressed by a proper language such as English, Spanish, Japanese, or the like which can be understood by the user in accordance with a country or district in which the apparatus in installed. A plurality of languages can be also expressed as necessary.

What is claimed is:

1. An automatic cash transaction apparatus which is constructed by a transaction apparatus main body and an additional unit which is arranged along a side of said transaction apparatus main body, wherein:

said transaction apparatus main body comprises cash transaction means for executing processes regarding a cash transaction based on a user instruction first input/output means for displaying a guidance for cash transaction, for inputting information corresponding to the guidance display, and for informing said cash transaction means; and said additional unit comprises telephone means for providing an audio sound to the user and for inputting information by the user through a plurality of dial buttons; and second input/output means for synthesizing audio data of the guidance based on an instruction from said cash transaction means, for generating an audio signal to said telephone means, for detecting information of said plurality of dial buttons depressed by the user in correspondence to said audio guidance, and for notifying the detected information to the cash transaction means.

2. An apparatus according to claim 1, wherein in said telephone means of said additional unit, a handset has a speaker to provide an audio sound to the user and a total of twelve dial buttons indicative of numerals 0, 1, 2, 3, 4, 5, 6, 7, 8, and 9 and symbols # and * are arranged in a matrix form of four rows and three columns in said handset.

3. An apparatus according to claim 1, wherein said second input/output means comprises:

audio data storing means for storing audio data;

audio synthesizing means for synthesizing the audio data based on the instruction from said cash transaction means and for generating an audio instruction;

touch tone differentiating means for differentiating a type of dial button of said telephone means; and receiver state detecting means for detecting an on-hook state of a receiver of the telephone means.

4. An apparatus according to claim 1, wherein said cash transaction means executes a paying process, a money inputting process, a balance checking process, or a bankbook writing process.

5. An apparatus according to claim 1, wherein in a case where a first input by the user is executed from said first input/output means, said cash transaction means sets an ordinary mode and executes an inputting/outputting process, and in a case where a first input by the user is executed from said telephone means of said additional unit, said cash transaction means sets an audio mode and executes an inputting/outputting process by the audio instruction and the dial buttons via said second input/output means.

6. An automatic cash transaction apparatus which is constructed by a transaction apparatus main body and an additional unit which is arranged along a side of said transaction apparatus main body, wherein said transaction apparatus main body comprises:

cash transaction means for executing processes regarding a cash transaction based on instruction from a user while communicating with a high-order apparatus; and first input/output means for displaying a guidance for cash transaction, for inputting information corresponding to the guidance display, and for informing said cash transaction means; and wherein said additional unit comprises:

telephone means for providing an audio sound to a user and for inputting by using dial buttons, speaker means for providing the audio sound to the user, and second input/output means for synthesizing audio data of a guidance based on an instruction from said cash transaction means, for generating an audio signal to said telephone means or said speaker means, for detecting the information of said dial buttons depressed by the user in correspondence to said audio guidance, and for notifying the detected information to the cash transaction means.

7. An apparatus according to claim 6, wherein in said telephone means of said additional unit, a handset has a speaker to provide an audio sound to the user and a total of twelve dial buttons indicative of numerals 0, 1, 2, 3, 4, 5, 6, 7, 8, and 9 and symbols # and * are arranged in a matrix form of four rows and three columns in said handset.

8. An apparatus according to claim 6, wherein said second input/output means comprises:

audio data storing means for storing audio data;

audio synthesizing means for synthesizing the audio data in said audio data storing means based on the instruction from said cash transaction means and for generating an audio signal of a guidance;

touch tone differentiating means for differentiating a kind of dial buttons of said telephone means;

receiver state detecting means for detecting an on-hook state of a receiver of said telephone means; and switching means for switching the audio signal of the guidance from said audio synthesizing means and for outputting the switched audio signal of the guidance to the speaker means or the telephone means.

9. An apparatus according to claim 8, wherein in the case where said receiver state detecting means detects that the telephone has been returned in a waiting state of an inputting operation by the dial buttons of said telephone means, said switching means of said additional unit switches an output destination of the audio signal of the audio guidance from said audio synthesizing means from the telephone means to the speaker means.

10. An apparatus according to claim 6, wherein in a case where a first input by the user is executed from said first input/output means, said cash transaction means of said transaction apparatus main body sets an ordinary mode and executes an inputting/outputting process, and in a case where a first input by the user is executed from said telephone means of said additional unit, said cash transaction means sets an audio mode and executes an inputting/outputting process by the audio guidance and the dial buttons via said second input/output means.

11. An apparatus according to claim 6, wherein said cash transaction means of said transaction apparatus main body executes a paying process, a money inputting process, a balance checking process, or a bankbook writing process.

12. An automatic cash transaction apparatus which is constructed by a transaction apparatus main body and an additional unit which is arranged along a side of said transaction apparatus main body;

said transaction apparatus main body comprises:

cash transaction means for executing processes regarding a cash transaction based on instruction from a user while communicating with a high-order apparatus; and input/output means for displaying a guidance for cash transaction, for inputting information corresponding to the guidance display or an audio guidance from said speaker means, and for informing said cash transaction means; and said additional unit comprises:

speaker means for providing an audio sound to the user and output means for synthesizing audio data of a guidance based on an instruction from said cash transaction means and for outputting an audio signal to said speaker means.

13. An apparatus according to claim 12, wherein said output means of said additional unit comprises:

audio data storing means for storing audio data; and audio synthesizing means for synthesizing the audio data in said audio data storing means based on the instruction from said cash transaction means and for generating an audio signal of a guidance.

14. An apparatus according to claim 12, wherein said cash transaction means of said transaction apparatus main body executes a paying process, a money inputting process, a balance checking process, or a bankbook writing process.

15. An automatic cash transaction apparatus which is constructed by a transaction apparatus main body and an additional unit which is arranged along a side of said transaction apparatus main body;

said transaction apparatus main body comprises:

cash transaction means for executing processes regarding a cash transaction based on instruction from a user while communicating with a high-order apparatus and first input/output means for displaying a guidance for cash transaction, for inputting information corresponding to the guidance display, and for informing said cash transaction means; and said additional unit comprises:

telephone means provided with a speaker for communicating an audio sound to the user in a handset thereof, and having in said handset twelve dial buttons representing numerals 0, 1, 2, 3, 4, 5, 6, 7, 8, and 9 and symbols # and * arranged in a matrix forming four rows and three columns, and for inputting by using said dial buttons and second input/output means for synthesizing the contents of the cash transaction and audio data of a guidance instructing an operation of any one of the dial buttons representing the numerals 0, 1, 2, 3, 4, 5, 6, 7, 8, and 9 and the symbols # and * among said dial buttons of said telephone means, which forms a response input to said transaction contents based on an instruction from said cash transaction means, for outputting the audio signal of said audio data to said speaker of said telephone means, for detecting information of said dial button pressed by the user in accordance with said audio guidance, and for notifying the detected information to said cash transaction means.

16. An automatic cash transaction apparatus which is constructed by a transaction apparatus main body and an additional unit which is arranged along a side of said transaction apparatus main body;

said transaction apparatus main body comprises:

cash transaction means for executing processes regarding a cash transaction based on instruction from a user while communicating with a high-order apparatus and first input/output means for displaying a guidance for cash transaction, for inputting information corresponding to the guidance display, and for informing said cash transaction means; and said additional unit comprises:

telephone means provided with a speaker for communicating an audio sound to the user in a handset thereof, and having in said handset twelve dial buttons representing numerals 0, 1, 2, 3, 4, 5, 6, 7, 8, and 9 and symbols # and * arranged in a matrix forming four rows and three columns, and for inputting by using said dial buttons, speaker means for communicating an audio sound to the user; and second input/output means for synthesizing the contents of the cash transaction and audio data of a guidance instructing an operation of any one of the dial buttons representing numerals 0, 1, 2, 3, 4, 5, 6, 7, 8, and 9 and symbols # and * among said dial buttons of said telephone means, which forms a response input to said transaction contents based on an instruction from said cash transaction means, for outputting the audio signal of said audio data to said telephone means or said speaker means, for detecting information of said dial button pressed by the user in accordance with said audio guidance, and for notifying the detected information to said cash transaction means.

17. An automatic cash transaction apparatus, comprising:

an accessory unit attached on a side of a transaction main body;

the transaction main body comprising:

cash transaction means for executing a cash transaction based on an instruction of a user;

first input/output means for displaying prompts, for inputting responses to the displayed prompts, and for inputting information to the cash transaction means; and the accessory unit comprising:

telephone means for outputting audio data and inputting data;

second input/output means for synthesizing audio data of the prompts, for generating an audio signal to the telephone means, for detecting the responses of the user, and for notifying the responses to the cash transaction means.

18. An automatic cash transaction apparatus, comprising:

an accessory unit attached to a side of a transaction main body;

the transaction main body comprising:

cash transaction means for executing a cash transaction based on an instruction of a user;

first input/output means for displaying prompts, for inputting responses to the displayed prompts, and for inputting information to the cash transaction means; and the accessory unit comprising:

telephone means for communicating an audio sound to the user through a handset, the handset has twelve dial buttons representing numerals 0, 1, 2, 3, 4, 5, 6, 7, 8, 9, and symbols # and *, arranged in a matrix forming four rows and three columns, for inputting data;

speaker means for communicating an audio sound to the user, and second input/output means for synthesizing information of the cash transaction and synthesizing audio data of a prompt, for outputting an audio signal to the telephone means, for detecting a response through the dial buttons, and for notifying the response to the cash transaction means.

* * * * *